(12) United States Patent
Van de Wetering

(10) Patent No.: US 10,009,338 B2
(45) Date of Patent: *Jun. 26, 2018

(54) METHODS AND SYSTEMS FOR A SUBSCRIPTION DATA SHARING SERVICE

(71) Applicant: Stephen James Van de Wetering, Los Angeles, CA (US)

(72) Inventor: Stephen James Van de Wetering, Los Angeles, CA (US)

(73) Assignee: Stephen James Van de Wetering, Los Angeles, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/042,696

(22) Filed: Feb. 12, 2016

(65) Prior Publication Data

US 2016/0212121 A1    Jul. 21, 2016

Related U.S. Application Data

(63) Continuation of application No. 14/598,437, filed on Jan. 16, 2015, now Pat. No. 9,264,461.

(51) Int. Cl.
*G06F 15/16* (2006.01)
*H04L 29/06* (2006.01)
(Continued)

(52) U.S. Cl.
CPC ............ *H04L 63/083* (2013.01); *H04L 63/08* (2013.01); *H04L 65/1069* (2013.01);
(Continued)

(58) Field of Classification Search
CPC .... H04L 63/083; H04L 63/10; H04L 65/1069
See application file for complete search history.

(56) References Cited

U.S. PATENT DOCUMENTS 6,442,263 B1    8/2002    Beaton et al.
7,748,617 B2    7/2010    Gray
(Continued)

OTHER PUBLICATIONS

International search Report and Written Opinion issued on PCT/US2016/013380, dated Mar. 17, 2016.
(Continued)

*Primary Examiner* — Michael A Keller
(74) *Attorney, Agent, or Firm* — Foley & Lardner LLP

(57) ABSTRACT

An illustrative method according to a set of instructions stored on the memory of a computing device includes receiving, by a processor of the computing device, a request for information from a requestor device during a real time communication between a sender device and a communication device associated with the requestor device. The method also includes sending, by the processor, the request for information to the sender device during the real time communication. The method also includes receiving, by the processor, from the sender device, a granted request for information including data requested in the request for information. The granted request for information is authorized by the sender device. The granted request for information is received during the real time communication. The method also includes sending, by the processor, the granted request for information to the requestor device during the real time communication.

18 Claims, 13 Drawing Sheets

(51) Int. Cl.
*H04W 12/08* (2009.01)
*H04W 12/02* (2009.01)

(52) U.S. Cl.
CPC ............. *H04W 12/08* (2013.01); *H04L 63/10* (2013.01); *H04W 12/02* (2013.01)

(56) References Cited

U.S. PATENT DOCUMENTS

| | | | |
|---|---|---|---|
| 8,374,334 B2 | 2/2013 | Sankaranarayanan | |
| 8,423,462 B1* | 4/2013 | Amacker | G06Q 20/363 |
| | | | 705/35 |
| 8,442,204 B2 | 5/2013 | Boroski et al. | |
| 8,619,951 B2 | 12/2013 | Johansen et al. | |
| 8,788,422 B2 | 7/2014 | Kalinichenko et al. | |
| 8,805,419 B2 | 8/2014 | Marr et al. | |
| 2003/0065921 A1* | 4/2003 | Chang | G06Q 20/401 |
| | | | 713/175 |
| 2007/0027842 A1 | 2/2007 | Lambert | |
| 2007/0121585 A1* | 5/2007 | Morrissey | H04L 67/02 |
| | | | 370/352 |
| 2008/0294447 A1 | 11/2008 | Steiner | |
| 2010/0094668 A1 | 4/2010 | Gupta et al. | |
| 2010/0260073 A1* | 10/2010 | Jager | H04M 11/066 |
| | | | 370/259 |
| 2012/0083253 A1 | 4/2012 | Van Der Vis-Kruijswijk | |
| 2013/0035054 A1 | 2/2013 | Ashton | |
| 2013/0073376 A1 | 3/2013 | Heath | |
| 2013/0159411 A1 | 6/2013 | Bowen | |
| 2014/0149742 A1* | 5/2014 | Yau | H04L 63/083 |
| | | | 713/159 |
| 2014/0201102 A1 | 7/2014 | Srinivasan et al. | |
| 2014/0359038 A1* | 12/2014 | Wen | H04L 51/28 |
| | | | 709/206 |
| 2014/0365395 A1* | 12/2014 | Arguelles | G06Q 10/10 |
| | | | 705/342 |

OTHER PUBLICATIONS

Non-Final Office Action on U.S. Appl. No. 14/598,437, dated Apr. 15, 2015.
Notice of Allowance on U.S. Appl. No. 14/598,437, dated Nov. 24, 2015.
International Preliminary Report on Patentability issued on PCT/US2016/013380, dated Jul. 18, 2017.

* cited by examiner

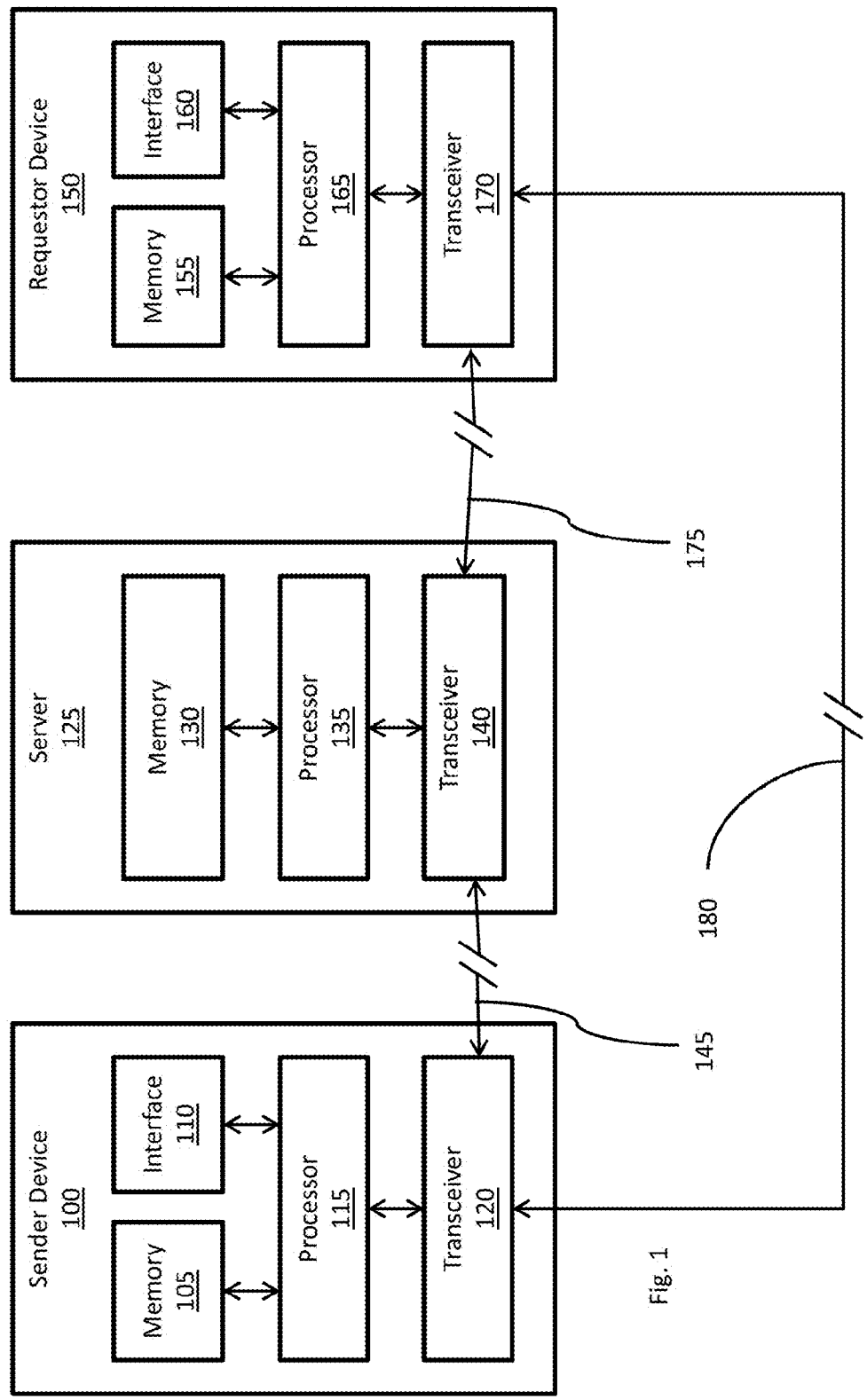

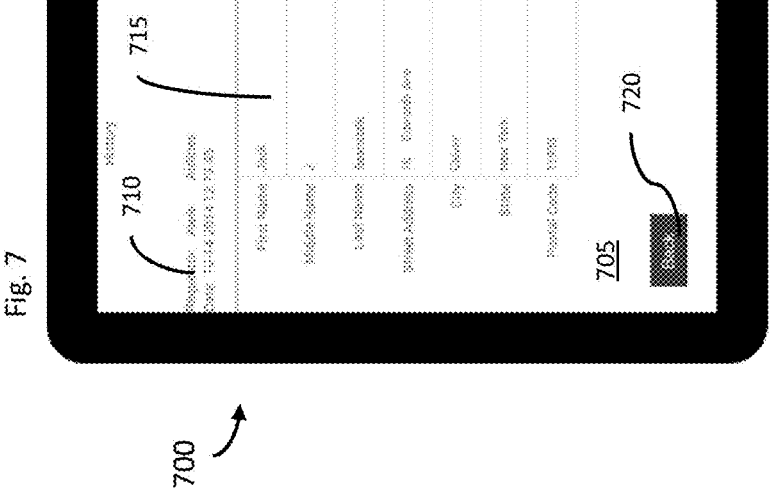
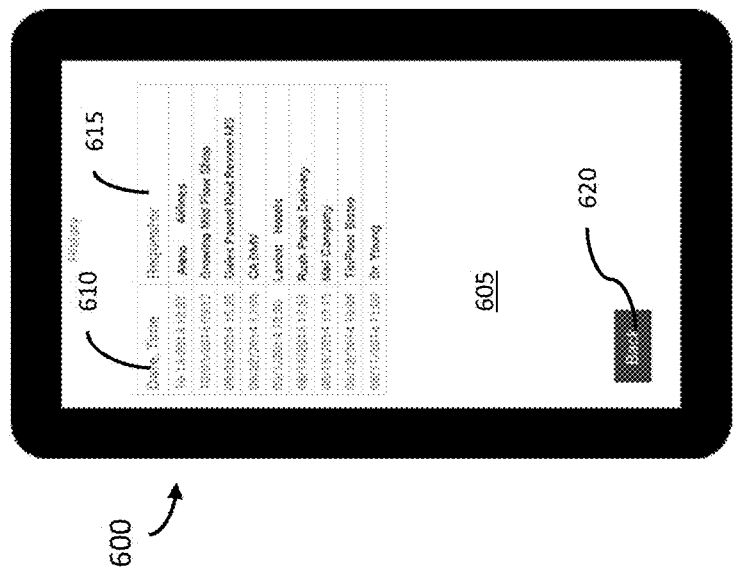

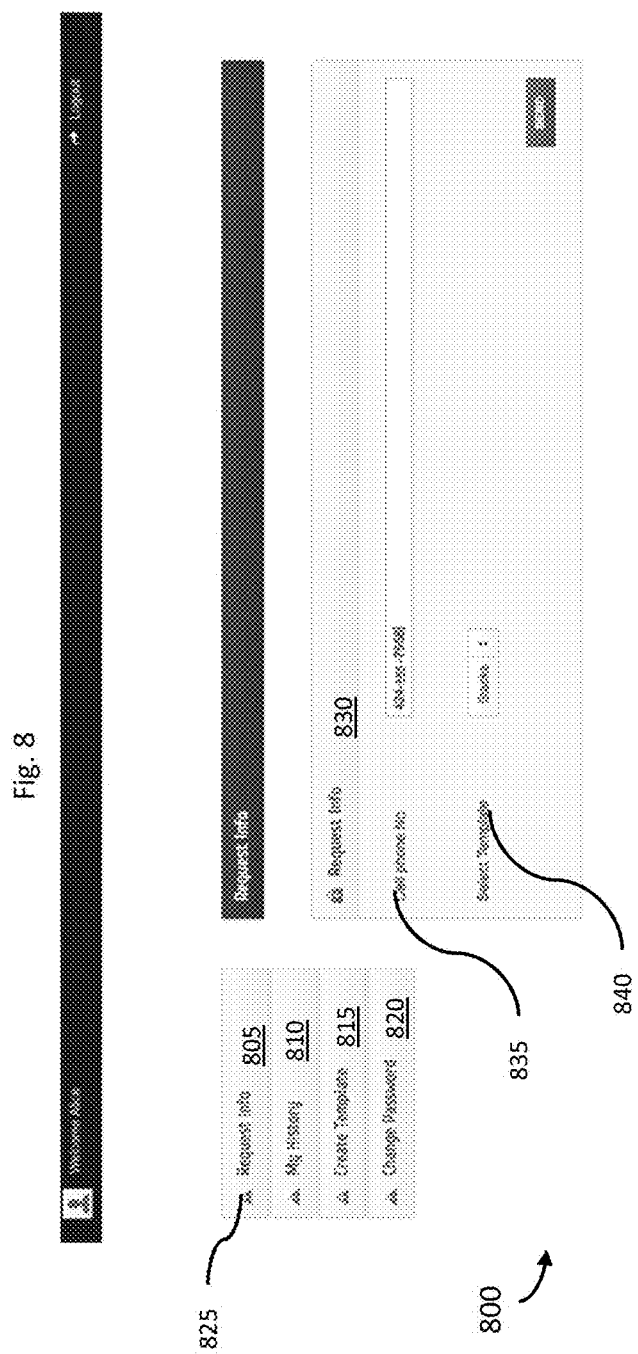

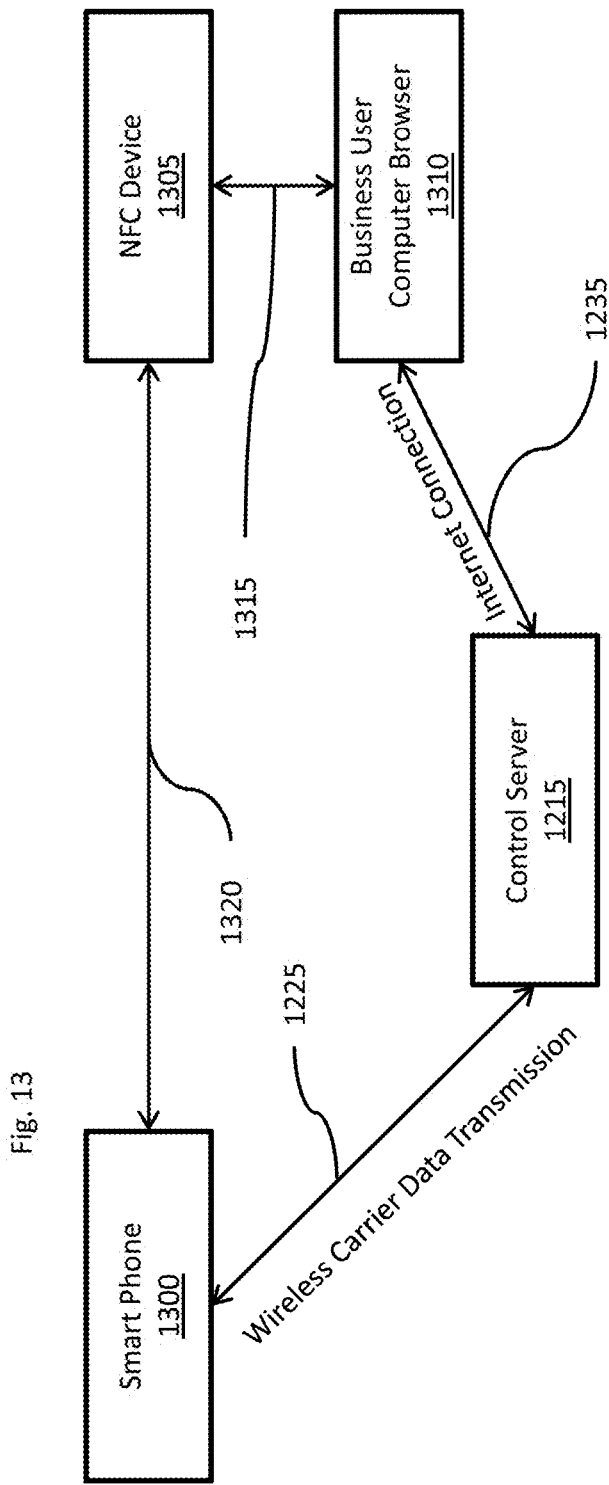

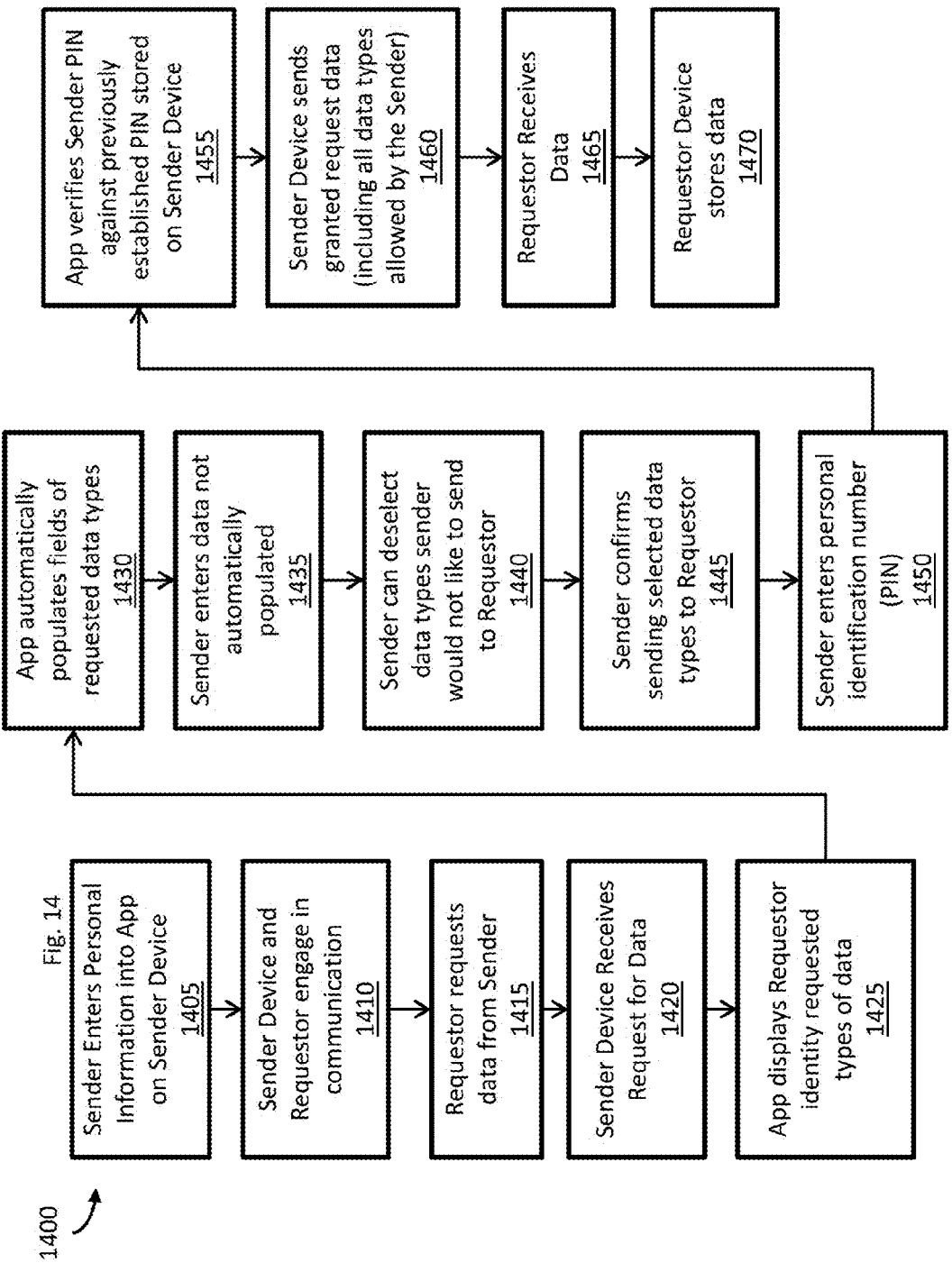

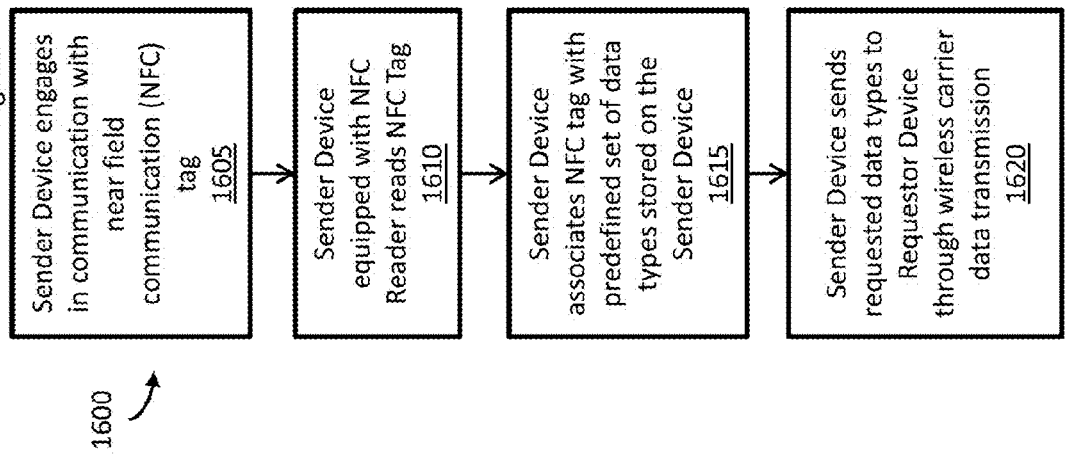
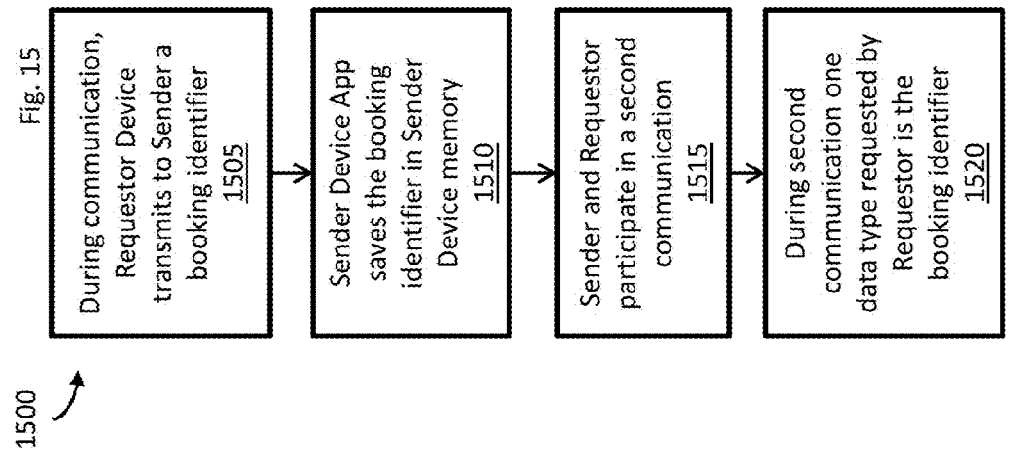

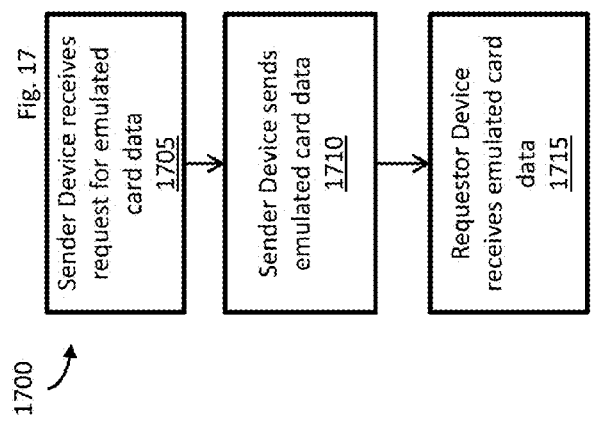

METHODS AND SYSTEMS FOR A SUBSCRIPTION DATA SHARING SERVICE

CROSS-REFERENCE TO RELATED PATENT APPLICATION

This application is a continuation application of and claims priority to U.S. patent application Ser. No. 14/598,437 filed on Jan. 16, 2015, now granted as U.S. Pat. No. 9,264,461, which is incorporated herein by reference in its entirety.

BACKGROUND

Businesses frequently make use of personal information in normal commerce. For example, if a customer buys an airline ticket online, the customer may enter various information or data regarding the customer. For example, the customer may input a name, payment information, birthdate, and contact information such as e-mail address and phone number. This information allows the airline to successfully link the ticket purchased to an individual customer and properly receive payment for the airline ticket.

In response to the purchase of an airline ticket, the airline may save various information related to the transaction with the customer. For example, the airline will save the customer's name and birthdate so that when the customer arrives at the airport an airline staff person can identify the customer by comparing the information in the system to a customer's government issued identification, for example.

When a customer performs a transaction with a business, the business also often gives information to the customer. In the most basic example, a receipt might be provided to a customer who makes a purchase at a retail store. Returning to the airline ticket purchased online example, the airline may provide an e-mail confirmation of the purchase to the customer. The e-mail confirmation can provide many different types of information. For example, the e-mail confirmation may include details of what was purchased, such as flight times, departure/arrival cities, seat assignments, and in-flight add-ons. The e-mail confirmation may additionally include a booking identifiers, which is a unique code linked to that purchase to make identifying the purchase in the future easy for the customer.

Additionally, these booking identifiers are often unique and contain a random sequence of alphanumeric characters. In this way, only the purchaser of the ticket has access to the booking identifier related to their purchased flight. This can add additional security to prevent fraud of another person attempting to use the flight ticket. Many other industries utilize booking identifiers, such as hotels, rental cars, shipping companies (such as a track your package type feature), online retail, tour organizers, cruise lines, and any other type of industry where purchase or reservation of the good or service occurs at a different time to the good being provided or the service being rendered.

SUMMARY

An illustrative method according to a set of instructions stored on the memory of a computing device includes receiving, by a processor of the computing device, a request for information from a requestor device during a real time communication between a sender device and a communication device associated with the requestor device. The method also includes sending, by the processor, the request for information to the sender device during the real time communication. The method also includes receiving, by the processor, from the sender device, a granted request for information including data requested in the request for information. The granted request for information is authorized by the sender device. The granted request for information is received during the real time communication. The method also includes sending, by the processor, the granted request for information to the requestor device during the real time communication.

An illustrative method according to a set of instructions stored on the memory of a computing device includes sending, by the processor, a request for information to a server device during a real time communication between a sender device and a communication device associated with the computing device. The method also includes receiving, by the processor, from the server device, a granted request for information including data requested in the request for information. The granted request for information is authorized by the sender device. The granted request for information is received during the real time communication.

An illustrative non-transitory computer readable medium having instructions stored thereon that, upon execution by a computing device, cause the computing device to perform operations. The instructions include instructions to receive a request for information from a requestor device during a real time communication between a sender device and a communication device associated with the requestor device. The instructions also include instructions to send the request for information to the sender device during the real time communication. The instructions also include instructions to receive, from the sender device, a granted request for information including data requested in the request for information. The granted request for information is authorized by the sender device. The granted request for information is received during the real time communication. The instructions also include instructions to send the granted request for information to the requestor device during the real time communication.

BRIEF DESCRIPTION OF THE DRAWINGS

Illustrative embodiments will hereafter be described with reference to the accompanying drawings.

FIG. 1 is a block diagram illustrating a sender device, server, and a requestor device that may be used in accordance with an illustrative embodiment.

FIG. 6 is a figure representing a user interface illustrating a data transmission history screen of a personal data sharing app that may be used in accordance with an illustrative embodiment.

FIG. 7 is a figure representing a user interface illustrating a data transmission detail history screen of a personal data sharing app that may be used in accordance with an illustrative embodiment.

FIG. 8 is a figure representing a user interface illustrating a request information screen of a personal data sharing business interface that may be used in accordance with an illustrative embodiment.

FIG. 13 is a block diagram illustrating a smart phone, control server, near field communication (NFC) device, and business user computer browser that may be used with an illustrative embodiment.

FIG. 14 is a flow diagram illustrating a method for using a personal data sharing app in accordance with an illustrative embodiment.

FIG. 15 is a flow diagram illustrating a method for using a personal data sharing app to receive a booking identifier in accordance with an illustrative embodiment.

FIG. 16 is a flow diagram illustrating a method for using a personal data sharing app with an NFC device in accordance with an illustrative embodiment.

FIG. 17 is a flow diagram illustrating a method for using a personal data sharing app to share emulated card data in accordance with an illustrative embodiment.

DETAILED DESCRIPTION

Figure 3:
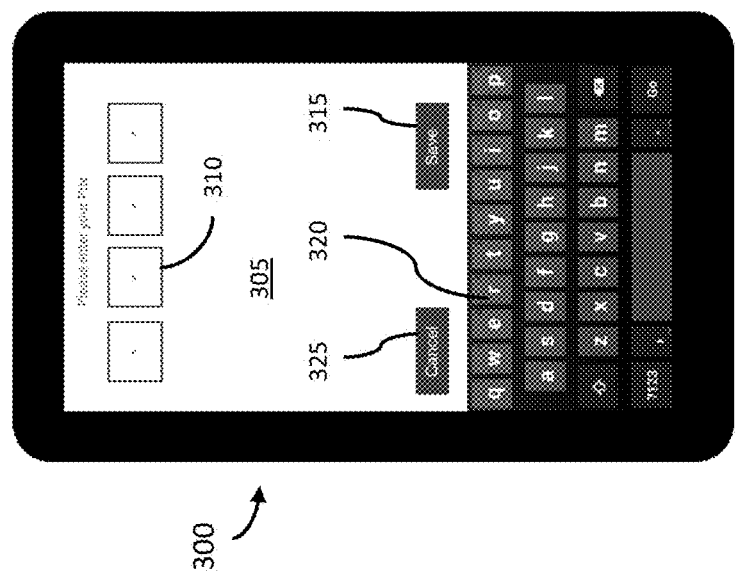
FIG. 3 is a figure representing a user interface illustrating a personal identification number (PIN) entry screen of a personal data sharing app that may be used in accordance with an illustrative embodiment.

Described herein are illustrative embodiments for methods and systems that provide for a personal data sharing application (app). The system and methods disclosed herein allow a business to request information, such as personal information, from a customer or potential customer while the business is on a call with the customer. For example, a hotel reservation operator may be on the phone with a customer booking a hotel room. The operator may, instead of asking for personal data or information during the call, can merely send a request for the needed data to the customer's smart phone. Advantageously, the customer can enter their personal data into the app once before going on any calls and save the data in the app. Once a customer is then on a call and receives a request from a business or operator, the app can automatically populate the data types requested with the customer's information. The customer can approve whether to send the information to the operator or not.

Additionally, the customer can select or de-select certain data types to share with the business and/or operator. For example, a sales representative on the phone may request the customer's zip code, even though that information may not be utilized to complete the transaction that is the subject of the call. In such an example, the user may de-select the zip code and prevent the zip code from being send to the sales representative. As a result, only a subset of the requested data is actually sent to the sales representative.

Additionally, the system may include security features. For example, a user/customer may establish a personal identification number (PIN) when setting up the app. The PIN is then entered whenever the user/customer confirms that he or she would like to send data to a business in response to a data request. In other words, the system will not transmit the data unless the user/customer enters their PIN to approve the transfer of data. Similarly, on the business side, a password, PIN, or other security feature may also be established. Since personal information can be acquired and saved to the software platform and interface on the business side, a password or other security feature can help keep sensitive personal information secure and free from compromise to third parties.

Advantageously, the methods and systems herein provide for getting accurate information from customers during the course of a transaction. Currently, acquiring information can be a tedious, time consuming and error prone process. In the context of a person making a reservation over the telephone with an airline or hotel for example, a significant amount of information is utilized to complete a reservation. Such information and different data types can include first name, last name, middle initial, address, phone number, e-mail address, credit card number, expiration date, security code, a birthdate, rewards number, financial account information, driver's license number, booking identifier, etc. The accuracy of this information is important. When taking in the information from the person making the reservation, the call quality can often be poor and a sales agent may request for the information to be repeated or may phonetically spell the information back to ensure the accuracy of the information acquired over the phone. Such a process can be time consuming, tedious and frustrating for both a sales agent and a customer.

Getting accurate information in a timely fashion is also important for people, companies, governments, etc. who are requesting name and address information for people who are interested in applying for a loan, subscribing to a magazine, fill out a department of motor vehicles (DMV) form or passport application, sign up for a class, or adding a name and cell phone number to a bake sale list. Filling out forms with a pen or pencil or transcribing information onto to a computer can be very time consuming. Handwriting can frequently be illegible and difficult to transcribe and transcription itself is effectively re-entering the same information over again, causing potential duplicitous efforts in data collection.

The systems and methods disclosed herein address the challenges of collection personal information for various purposes and in various settings. Various components may be used in various embodiments as disclosed herein. For example, a cell phone application (app) can be used to store personal information and control who is granted access to it. In another example, a server application can facilitate requests between a business and the cell phone app. Further, a near field communication (NFC) device or Bluetooth™ Low Energy (BLE) Transponder like iBeacon™ can be used for requesting information when a cell phone use is in close proximity to the requestor of the data (or a location of the business that a sales representative or other agent works for).

The cell phone app can hold information about a user. This information can be personal details like first name, last name, address, e-mail address, cell phone, credit card numbers, loyalty/affinity program numbers, driver's license number, social security number, date of birth, other demographic information, passport number, spouses name, rewards account numbers, bank account numbers, customer account numbers, etc. Much of the information that can be stored and transmitted by the system and methods herein is personal and sensitive. The cell phone app can also control how the personal information is released and provides security regarding accessing and transmitting the information on the cell phone app interface. The cell phone app also permits the releasing of the information to businesses that make requests to the cell phone by a business software application.

The system can also include a server that contains a list of registered cell phones. In some embodiments, the system may store only the list of cell phone numbers and no additional information regarding the registered cell phones. In this way a user of the personal data app maintains complete control over as much of their personal information as possible. A list of registered business and users who can initiate requests for information may also be stored on the server. Such registered business and users may also be able to save results from historical requests. That is, if a business receives information, it may be saved by the business, either on a business device or the server itself. A list of available data fields from which to make requests for information may also be stored on the server and/or a registered business or other user. The server may also maintain information about businesses or other users regarding particular fields that a company may request or are prohibited from requesting. For example, a business who sells basketballs may be prevented from requiring social security numbers and birth dates from their customers because that type of information is likely irrelevant to the business of basketball selling. Furthermore, the server and/or business application may control certain types of data that is transmitted. For example, if a customer's credit card number is transferred, the business operator may only see, for example, four digits of the credit card number. The business computer system may still receive the full credit card number for processing payments, but it will not be available to simply save and see in the business application, and the operator cannot see the whole credit card number. In this way, the system achieves added security.

In another embodiment, the system can facilitate the transfer of credit card, debit card, pre-paid card, electronic funds transfer (EFT), or automatic debit information in different ways. For example, the system may facilitate transfer between a sender and a receiver of credit, debit, or pre-paid card emulation information. For example, host card emulation (HCE) software and hardware may be part of a mobile smart phone such that a user of the mobile smart phone can emulate the representation of a smart card. In other words, the mobile smart phone could create a signal that emulates the signal of a unique debit or credit associated with a financial account of the user of the mobile smart phone. In this way, the mobile smart phone may be able to interact with near field communication (NFC) or Bluetooth™ Low Energy (BLE) Transponder like iBeacon™ devices or other devices that are configured to communicate with smart cards. In this way financial account and/or payment information can be easily shared between a mobile phone user and another party, such as a merchant as disclosed herein. Advantageously, a merchant may pay relatively lower fees for initiating a transaction using host card emulation (HCE) information as opposed to keying in the individual alphanumeric characters that represent financial account information. In other words, a merchant may pay lower fees to a credit card provider for a normal credit card swipe or NFC/smart card transaction than when a merchant employee has to physically type in the credit card numbers of a customer to initiate a transaction. Similarly, other NFC technologies that do not utilize HCE may be subject to the relatively higher fees of a keyed in transaction. Accordingly, by leveraging HCE technology, the system may allow a merchant to pay lower fees overall than it would keying in transactions or using certain non-HCE NFC technologies.

In another embodiment, the system may utilize emulated financial account information in a non-NFC or Bluetooth™ Low Energy (BLE) Transponder implementation. For example, a merchant requestor may request credit card information to book a hotel room for a customer while the customer is on a phone call with the merchant. Using the systems and methods disclosed herein, the request can be sent from the merchant to the smart phone of the customer. The customer can use an application on the smart phone as disclosed herein to respond to the request by sending the requested credit card information. In some embodiments, the system may facilitate the transfer of credit card information (or other payment information) that facilitates the similar to keying in of information for a credit card. However, in this embodiment, the smart phone may send emulated card information that represents the credit card itself. The emulated card information may be sent over a data network facilitated by a cell phone service provider. The emulated card information may also be sent over a wireless or wired network connected to the internet, or any other type of remote communication. In this way, the emulated card information sent from the customer to the merchant may be used to process a transaction. Advantageously, the system may facilitate a transaction that has relatively lower fees paid to a card provider than a transaction that is keyed in, as discussed above.

The server and/or business application may also have a database of data types or fields that a company or user may use. For example, a business may establish a template of commonly used data types. The system may also be pre-programmed with default commonly used data types. Such defaults may be general or tailored to a particular industry and/or business unit. In this way, if an operator has different types of data that the operator needs from different customers, the operator can quickly select a template or predetermined list of requested data types. Such lists or templates may also be previously established lists. The business application includes a requesting function that will communicate with the server and any cell phone user registered to the server. An application programming interface (API) may also be incorporated into the system. The API allows businesses and users to make custom requests and receive custom data based on data types predefined by the business or customer. This is advantageous for the business or customer because the system can then essentially translate data from a user in to a format that will, for example, flow directly into a target database belonging to the business or other user. In this way, the system can be specially tailored to meet the data sharing needs of varying business.

When a cellphone user is in the immediate area of a business and needs to share information, data can be shared over a near field communication (NFC) device or a Bluetooth™ Low Energy (BLE) Transponder like iBeacon™ (as just two examples). Such protocols allow a cell phone to share data by, for example, tapping or holding the cell phone within rage of an NFC device or iBeacon™ while the NFC reader or iBeacon communicates a request from a business similar to other contexts disclosed herein, such as data transfer during a phone call.

The business application permits businesses who subscribe to the service to make requests for information to the cell phones who have the cell phone app. The cell phones all register to the service so that a subscriber's (or sender's) cell phone number is known, but the name or any other information is not. The server allows a business user to send a request to the cell phone app which waits for the request in the background. The request from the business user will identify the business that is making the request and the fields of information that the business user is requesting.

In the context of a phone call, when the cell phone app user receives a request, it can display the name of the business, the name of the person making the request and the fields that are being requested. The cell phone user is asked if it is OK to release this information to the business user. If the cell phone user approves releasing the information, he or she are asked to enter a PIN and then the requested data is sent from the cell phone to the server where the business user will be able to access the released data. Such information could include credit card information and a secure element authentication token. For credit card details, the information may show as masked except for the last 4 digits and the card provider (e.g., Amex™, Master Card™, Visa™, etc.). If a cell phone user does not have a field populated, the field can show up highlighted on the cell phone, and the cell phone user can populate that field during the call.

The system may have checkboxes by each of the fields that are part of a data request so that the cell phone user can select or de-select any of fields thereby controlling what data types the business user will receive. The cell phone user is in complete control of what data field gets released and to whom. The user may release all of the requested fields or deselect several and only send a few. On the cell phone, the user has access to the history of what companies, people or governments have made requests and what information was released and when.

The systems and methods disclosed herein can also be used to transmit data other than just demographic, payment, and/or booking/reservation information. For example, the a requestor device may request a photo, video, spreadsheet, presentation, text file, or other type of electronic documents or file. In this embodiment, the document or file may be stored on the sender device. The document or file may be stored to be associated with the software application used for the sending of information, or the document or file may be stored on the sender device but not be associated with the software application. Where the document or file is not associated with the software application, the software application may still access or find the document or file and send it to the requestor similar to other personal data as disclosed herein (that is, the user will still have control over whether the document or file is sent by the software application). In another embodiment, the document or file is stored in association with the software application. This is a document that can be accessed and is controlled by the software application disclosed herein. In alternative embodiments, access to this file may or may not be possible through mediums other than the software application disclosed herein. For example, the software application may facilitate taking a photo of the user. This photo may be stored by the application either only in the application specific memory of the sender device, or may be stored along with other photos on the sender device. In either case, the photo is still associated to the application and identifiable by the application as a photo of the user. Thus, if a requestor requests a photo of the user, the photo can be easily recalled by the application similar to the personal data as disclosed herein.

The user (via the sender device) can then determine, just like the other types of data as disclosed herein, whether to send the requested photo (or other file or document) to the requestor. A photo (or other file or document) can then be sent to the requestor through wireless networks, the internet, cellular networks, etc. as disclosed herein.

In the context of being at a store or in a physical location, a request can be made via a NFC device or iBeacon™. The cell phone user can see the request the same way as if they are on a phone call. The request is can also be transmitted over NFC and/or Bluetooth™ Low Energy (BLE) protocols.

On the server there is an Application Programming Interface (API) which can allow business users to generate requests from their own internal systems without having to use a web interface on the server. On the server there is an interface which will have a list of all of fields available to make requests of. The API allows businesses (or those businesses' databases) that may call a "first name" a "given name" or a "surname" as a "last name" to map the fields according to the way their systems use the information. Each of these fields correspond to a field that is available to populate on the cell phone app. Business users can also auto populate a cell phone number from the business's caller identification (ID) when making a request for information to simplify the request for information process.

In the cell phone application, fields are available for things such as record locators, serial numbers, and ticket numbers. During a call or in the store, if a transaction generates a specific number or code that the business or user uses to identify a particular flight, hotel reservation, or ticket number from a call (just as some examples), a business user may push that data to the cell phone. All such examples of reservation numbers, ticket numbers, serial numbers, etc. as disclosed herein are referred to herein collectively as a booking identifier. Such information can be stored in the cell phone application and associated with the business that sent the booking identifier. In the future, when the cell phone user is on the phone with the business, the business may request the booking identifier from the cell phone, thereby making it easier for the business or user to discuss a relevant transaction without either party having to research the original transaction or communicate the transaction over the phone, manually, etc.

From the perspective of the server of the system, the following may occur. A request for information can be received from a business computer, here called a requestor device. Such a request occurs during a real time communication between a sender device (the customer's smart phone) and a communication device associated with the requestor device. For example, the business sales rep may be on a land line telephone, which would be the communication device associated with the requestor device. In another embodiment, the communication device may be integrated partially or wholly into the requestor device. For example, many operators use headsets that are tied into a phone system and a computer system. Additionally, other technologies may be used for a real time communication through a requestor device. For example, the real time communication may be a voice over internet protocol (VoIP) call, where the call is placed on a computer utilizing an internet connection. The real time communication may also be something other than a voice call. For example, the real time communication could utilize text, such as phones for the hearing impaired. In other embodiments, the real time communication could be a real time chat on a computing device, a video conference, or other type of real time communication.

The server sends the request for information received from the requestor device to the sender (customer) device during the real time communication. The server can receive the granted request for information comprising data requested in the request for information. In other words, the server can receive the information from the sender device that it asked for. As disclosed herein, the sender has the option to not send all of the requested data or even send none of the requested data. Accordingly, the granted request for information has been authorized by the sender device and the granted request for information is received during the real time communication. The server also sends the granted request for information to the requestor device during the real time communication. In other words, the requestor device can view, access, download, save, etc. the information from the sender device that the requestor initially requested.

The server also associates the requestor device with a first identifier. For example, the first identifier may be the name of the company, a unique number, a phone number of the company, or some other identifier. In this way, when a requestor sends a request for information, the requestor can also include this first identifier, so that the server can identify the requestor. Additionally, the server can verify that the requestor is actually subscribed to the service by checking the identity of the requestor using the first identifier. The server can also send the first identifier to the sender device. In this way, the sender knows who is requesting the information. For example, the first identifier could include information regarding the company the operator works for and the name of the operator. In this way, the sender can safely rely on the request for information as being legitimate and related to the call the sender is currently on.

The server can also receive a second identifier from the requestor device. The second identifier identifies the party to whom the request for information is directed. Accordingly, upon reception of the second identifier, the server associates the second identifier with the sender device. By associating the second identifier with the sender device, the server can determine where to actually send the request for information. For example, the requestor may include the phone number of the sender as the second identifier. This may be accomplished by using a caller identification (ID) function of the requestor's communication device. Determining a second identifier may also be done in other ways, such as requesting the second identifier from the sender over the phone, determining the senders internet protocol (IP) address, or any other ways of identifying the sender or the sender device. If the phone number of the sender is the second identifier, the server can then associate the second identifier with the sender's device. With that association, the server can determine where to send the request for information.

The server may also receive a booking identifier from the requestor device. As discussed herein, this may be a reservation or ticket number, for example. The booking identifier may come about as a result of a purchase made during the real time communication. The booking identifier received from the requestor device is also associated with the second identifier. That is, when the requestor device sends the booking identifier to the server, a phone number or other identifier of the sender is also included. In this way, the server can determine where to send the booking identifier to during the real time communication. If the sender and the requestor engage in a second, subsequent call, the booking identifier is then saved in the app on the sender's device. In this way, a requestor can easily ask for a booking identifier using the system and methods as disclosed herein to get the booking identifier from the sender quickly and easily. Accordingly, during a second real time communication, the server may receive the booking identifier from the sender's device and send the booking identifier to the requestor's device.

In an alternative embodiment, the booking identifier sent to the server from the requestor device may also be stored on the server. In this embodiment, the booking identifier would be stored and associated with the second identifier that indicates the sender's device. Since there is not necessarily private information relating to the booking identifier, storing the booking identifier on the server may not compromise the sender's personal information. By storing the booking identifier on the server, the requestor device could merely request the server for a booking identifier if a subsequent real time communication was initiated, instead of requesting the sender device. Accordingly, during a second real time communication, the server may receive the second identifier from the requestor device, and in response send the booking identifier to the requestor device.

From the perspective of the requestor device (for example, the computer of the business), a real time communication is engaged in between the requestor device (or some phone or other device associated with the requestor device) and the sender device. In other words, a communication between a device related to the company that controls the requestor device and a sender device occurs. The requestor device then sends a request for information to the server. After the server and sender device perform functions, the requestor device receives a granted request for information that includes data requested in the request for information. The granted request for information may be some or all of the requested information, depending on what the sender approved. In other words, it is possible that the requestor device only receives a subset of the information it sought in the request for information. The granted request for information can also be received by the requestor device during the real time communication.

The requestor device can store the granted request for information. That is, the information received by the requestor device may be saved by the requestor device. For example, the requestor may wish to save information related to a purchase or reservation made by the sender.

The requestor device may also determine a first identifier associated with the sender device. For example, the requestor device may use caller ID to determine what number a caller is calling from. The first identifier can then be sent to the server to help the server identify where to send a request for information.

A request for information may be sent by utilizing a predetermined list of a plurality of requested data types. For example, the requestor device system may be equipped with software that allows the requestor to select a certain template of desired information. For example, a Template A may be pre-programmed to ask a sender their name, age, height, and weight. In another example, Template B, may be pre-programmed to ask a sender their name, credit card number, credit card company, credit card expiration date, credit card security code, and the zip code for the billing address of the credit card. Such templates may be pre-stored on the requestor's system, or the requestor may determine their own custom templates. Additionally, as discussed herein, the API may allow the requestor to rename fields of data types requested in order to, for example, match the fields already existing in the requestor's database. For example, the system may call a data type "mother's maiden name," while a requestor database may call the same data type "secret question answer 1."

From the perspective of the sender device (a customer, for example), the sender may download the app for their smart phone (or other device). The sender can then enroll in the system. This involves setting a PIN to be stored on the smart phone, which is used to authorize data sharing and adjusting settings and information/data within the app. By enrolling, the sender has their cell phone number stored in the server. In one embodiment, only the sender's phone number is stored in the server, while all other personal information relating to the sender is stored on the sender's smart phone. In other embodiments, some other personal information, data types booking codes, rewards codes, etc. may be stored in the server. The sender can also enter into the app potential information that requestors may request. In this way, when a request for information comes through, the sender may not have to enter any (or as much) information to satisfy the request. The app can automatically populate the fields of a particular request for information, and all the sender does is approve the sharing and/or enter the sender's PIN.

Once enrolled, the sender may engage in a real time communication with a requestor and/or a requestor device (or other communication device associated with or connected to the requestor device). While in the real time communication, a request for information from the server may be received (although the request for information will have originated with the requestor). The sender can then approve and authorize the sharing of the requested information. The authorization may occur with a PIN. However, other authorizations may also be used, such as fingerprint, voice recognition, password, multi-stage authentications, etc. In another embodiment, the level and/or type of security used to authorize a sharing of information may depend on the type of information requested. That is, the more risky the sharing of certain information is, the more secure the authorization process may be. Additionally, the sender may authorize only a subset of the total requested information to be sent to the server.

After authorization, the sender device sends the information to the server. The sender device may also receive a booking identifier from the server (originating from the requestor device). The app can store the booking identifier, so that it can be easily sent to a requestor during subsequent real time communications.

FIG. 1 is a block diagram illustrating a sender device, server, and a requestor device that may be used in accordance with an illustrative embodiment. In alternative embodiments, fewer, additional, and/or different components may be included in the system. In FIG. 1, there is a sender device 100, a server 125, and a requesting device 150. The sender device 100 includes a processor 115 that is coupled to a memory 105. The processor 115 can store and recall data and applications in the memory 105. The processor 115 can execute sets of instructions stored on the memory. In one example, a set of instructions may be a mobile application (app). The memory 105 may store more than one app. Throughout the present application, if an app is referred to, it means a set of instructions stored on a memory that can be executed by a processor. Here, the processor 115 may also display objects, applications, data, etc. on an interface 110. The processor 115 is also coupled to a transceiver 120. With this configuration, the processor 115, and subsequently the sender device 100, can communicate with other devices, such as the server 125 through a connection 145 or the requestor device through a connection 180.

The server 125 includes a processor 135 that is coupled to a memory 130. The processor 135 can store and recall data and applications in the memory 130. The processor 135 is also coupled to a transceiver 140. With this configuration, the processor 135, and subsequently the server 125, can communicate with other devices, such as the sender device 100 through the connection 145 or the requestor device through a connection 175.

The requestor device 150 includes a processor 165 that is coupled to a memory 155. The processor 165 can store and recall data and applications in the memory 155. The processor 165 can execute sets of instructions stored on the memory. In one example, a set of instructions may be web browser that displays and/or executes a webpage. The processor 165 may also display objects, applications, data, etc. on an interface 160. The processor 165 is also coupled to a transceiver 170. With this configuration, the processor 165, and subsequently the requestor device 150, can communicate with other devices, such as the server 125 through the connection 175 and the sender device 100 through the connection 180.

In just one illustrative embodiment, sender device 100 may be a smart phone, and the requestor device 150 may be a desktop computer. In such an embodiment, the desktop computer may be used to execute a browser and engage in a real time communication with the sender device 100. The configuration of the sender device 100, the server 125, and the requestor device 150 is merely one physical system on which the disclosed embodiments may be executed. Other configurations of the devices shown may exist to practice the disclosed embodiments. Further, configurations of additional or fewer devices than the ones shown in FIG. 1 may exist to practice the disclosed embodiments. Additionally, the devices shown in FIG. 1 may be combined to allow for fewer devices or separated where more than the three devices shown exist in a system.

The devices shown in the illustrative embodiment may be utilized in various ways. For example, the connections 145, 175, and 180 may be varied. The connections 145, 175, and 180 may be a hard wired connection. A hard wired connection may involve connecting the devices through a USB (universal serial bus) port, serial port, parallel port, or other type of wired connection that can facilitate the transfer of data and information between a processor of a device and a second processor of a second device, such as between the sender device 100 and the server 125. In another embodiment, the connections 145, 175, and 180 may be a dock where one device may plug into another device. While plugged into a dock, the client-device may also have its batteries charged or otherwise be serviced. In other embodiments, the connections 145, 175, and 180 may be a wireless connection. Such a connection may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, the connections 145, 175, and 180 represent several different computing devices and network components that allow the various devices to communicate through the internet, either through a hard-wired or wireless connection. The connections 145, 175, and 180 may also be a combination of several modes of connection.

To operate different embodiments of the system or programs disclosed herein, the various devices may communicate in different ways. For example, the sender device 100 may download various software applications, such as a personal data sharing app, from the internet. The requestor device 150 may be able to download the personal data acquisition business software application. In another embodiment, the requestor device 150 may access the personal data acquisition business interface through a browser. Such software applications may allow the various devices in FIG. 1 to perform some or all of the processes and functions described herein. Additionally, the embodiments disclosed herein are not limited to being performed only on the disclosed devices in FIG. 1. Many various combinations of computing devices may execute the methods and systems disclosed herein. Examples of such computing devices may include desktop computers, cloud servers, smart phones, personal computers, servers, laptop computers, tablets, blackberries, RFID enabled devices, wearable electronic devices, or any combinations of such devices or similar devices.

In one embodiment, a download of a program to the sender device 100 involves the processor 115 receiving data through the transceiver 120 through the internet and from the server 125. The processor 115 may store the data (like the personal data sharing app) in the memory 105. The processor 115 can then execute the program at any time, including at a time specified by the user through the interface 110. In another embodiment, some aspects of a program or app may not be downloaded. For example, the program or app may be an application that accesses additional data or resources located in the server 125. In another example, the program may be an internet-based application, where the program is executed by a web browser and stored almost exclusively in the server 125, such as a browser run on the requesting device 150.

In yet another embodiment, once downloaded to the sender device 100, the program or app may operate in part without communication with the server 125. In this embodiment, the sender device 100 may access or communicate with the server 125 only when acquiring the program or sharing data through the connection 145. In other embodiments, a constant or intermittent connection 145 may exist between the server 125 and the computing device 100. Where an intermittent connection exists, the sender device 100 may only need to communicate data to or receive data from the server 125 occasionally.

The configuration of the server 125 the sender device 100, and the requestor device 150 is merely one physical system on which the disclosed embodiments may be executed. Other configurations of the devices shown may exist to practice the disclosed embodiments. Further, configurations of additional or fewer devices than the ones shown in FIG. 1 may exist to practice the disclosed embodiments. Additionally, the devices shown in FIG. 1 may be combined to allow for fewer devices or separated where more than the two devices shown exist in a system.

In other embodiments, specialized hardware may exist on the devices shown in FIG. 1 that is specifically designed to perform or execute the various embodiments disclosed herein. For example, the requestor device may include a NFC device. Additionally, the configuration of FIG. 1 may also include an iBeacon™, which may communicate with any of the devices wirelessly to perform the functions and methods disclosed herein.

Figure 2:
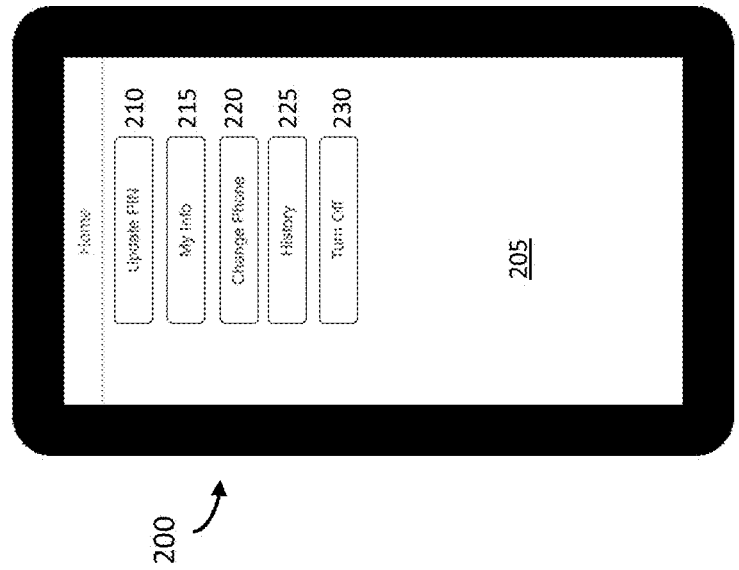
FIG. 2 is a figure representing a user interface illustrating a home screen of a personal data sharing app that may be used in accordance with an illustrative embodiment.

FIG. 2 is a figure representing a user interface 200 illustrating a home screen of a personal data sharing app that may be used in accordance with an illustrative embodiment. In alternative embodiments, fewer, additional, and/or different data and/or interactive elements may be included in the user interface. The user interface 200 shows a home screen 205. The home screen may part of a personal data sharing app used on a sender device like a mobile smart phone, for example. The home screen 205 includes an update PIN 210 button, a my info 215 button, a change phone 220 button, a history 225 button, and a turn off 230 button.

If a user presses update PIN 210, the user is directed to a user interface, for example user interface 300 discussed below, where the user can set or change their PIN. As disclosed herein the PIN can be used for security purposes and to authorize the sharing of a user's personal data.

If a user presses my info 215, the user is presented with a user interface, for example user interface 500 discussed below, where the user can update his or her personal information. If a user presses change phone 220, the phone that the user currently has subscribed for the data sharing service will be deactivated. The app may request the phone number of the user's new phone before deactivating the current phone. Deactivating the current phone may include removing the old phone's number (or other identifier) from the list of subscribed phones on a server, and adding the new phone's number (or other identifier) to the list of subscribed phones.

If a user presses history 225, the user is presented with a user interface, for example user interface 600 as discussed below, which allows the user to see past instances of sharing data. If a user presses turn off 230, the user exits the app. In an alternative embodiment, pressing turn off 230 does not close the app, but rather makes it so that the app cannot receive any requests for information. In this embodiment, the turn off 230 button serves as a toggle. If the button is in the "On" state it will read "Turn Off" and the app will be able to receive requests for information. If the button is in the "Off" state it will read "Turn On" and the app will not be able to receive requests for information.

FIG. 3 is a figure representing a user interface 300 illustrating a personal identification number (PIN) entry screen of a personal data sharing app that may be used in accordance with an illustrative embodiment. In alternative embodiments, fewer, additional, and/or different data and/or interactive elements may be included in the user interface. The user interface 300 shows a PIN screen 305. This PIN screen 305 may be used to change a PIN, such as when update PIN 210 is pushed. The PIN screen 305 may also allow the user to enter a PIN to authorize data sharing. The PIN dialog 310 shows the user how many numbers have been entered but does not actually display the numbers for security reasons. Here, a four digit PIN is used. In another embodiment, the PIN dialog 310 does show the numbers of the PIN.

A save 315 button can be pressed to save a new PIN or confirm that data should be shared. A cancel button 325 can return the user to a previous interface screen without changing the PIN or authorizing data sharing. A keyboard 320 allows the user to enter alphanumeric characters as their PIN.

Figure 4:
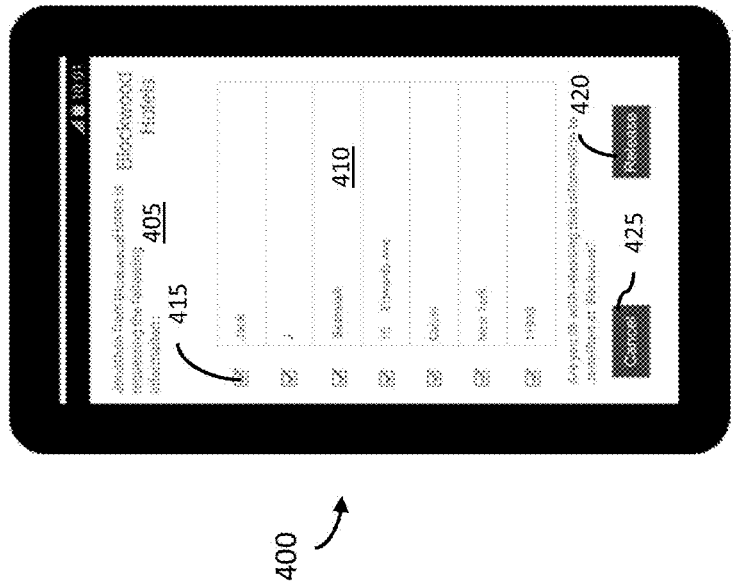
FIG. 4 is a figure representing a user interface illustrating an information request screen of a personal data sharing app that may be used in accordance with an illustrative embodiment.

FIG. 4 is a figure representing a user interface 400 illustrating an information request screen of a personal data sharing app that may be used in accordance with an illustrative embodiment. In alternative embodiments, fewer, additional, and/or different data and/or interactive elements may be included in the user interface. The user interface 400 shows a request for information screen 405. The request for information screen 405 shows auto-populated data previously entered by the user, including last name 410, which reads "Beanstalk." All of this data corresponds to a request for information. In this embodiment, the request for information comes from Jonathan from Blockwood Hotels.

Checkboxes 415 allow the user to select which data to release to Jonathan from Blockwood hotels. Although a checkbox is shown here, other embodiments may utilize different ways to designate whether to share each data field or not. Release button 420 allows a user to release to the requestor all of the data that currently has a checked box next to it. In the present embodiment, all of the data would be released if the user pushed the release 420 button. If a cancel 425 button was pressed, the system would return to the previous screen and no data would be shared or released.

Figure 5:
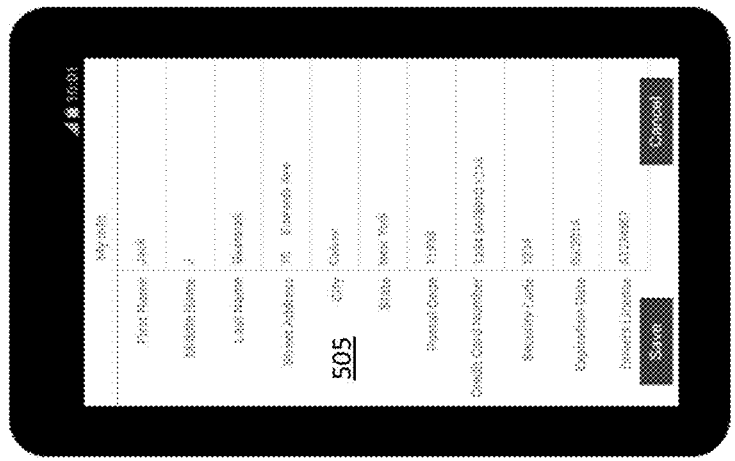
FIG. 5 is a figure representing a user interface illustrating a data entry screen of a personal data sharing app that may be used in accordance with an illustrative embodiment.

FIG. 5 is a figure representing a user interface 500 illustrating a data entry screen of a personal data sharing app that may be used in accordance with an illustrative embodiment. In alternative embodiments, fewer, additional, and/or different data and/or interactive elements may be included in the user interface. The user interface 500 shows a my info screen 505. Here, the user can enter information about him or herself so that if/when an information request is received, the requested information (such as 410 in FIG. 4) can be automatically populated.

FIG. 6 is a figure representing a user interface 600 illustrating a data transmission history screen of a personal data sharing app that may be used in accordance with an illustrative embodiment. In alternative embodiments, fewer, additional, and/or different data and/or interactive elements may be included in the user interface. The user interface 600 shows a history screen 605. It includes date and time 610 of past data releases, as well as the identity of the requestor 615 for past data releases. If the user selects back 620, the interface will return to the home screen 205 shown in FIG. 2. If an entry on the history screen 605 is selected, a user interface 700, as discussed below, is shown.

FIG. 7 is a figure representing a user interface 700 illustrating a data transmission detail history screen of a personal data sharing app that may be used in accordance with an illustrative embodiment. In alternative embodiments, fewer, additional, and/or different data and/or interactive elements may be included in the user interface. The user interface 700 shows a history detail screen 705. The user may navigate to the history detail screen 705 by selecting an entry from the history screen 605. Here, the history detail screen shows a requestor identity and time stamp 710, as well as all of the information shared 715 with that requestor. If a user selects back 720, it will return the user to the history screen 605.

FIG. 8 is a figure representing a user interface 800 illustrating a request information screen of a personal data sharing business interface that may be used in accordance with an illustrative embodiment. In alternative embodiments, fewer, additional, and/or different data and/or interactive elements may be included in the user interface. The user interface 800 includes a menu with request info 805, my history 810, create template 815, and change password 820. Each menu item also has a symbol, such as symbol 825. The symbol 825 may indicate various things. For example, the symbol 825 may indicate the user should address the menu item. For example, the symbol on the my history 810 may indicate that a new data release has been added to the history.

The user selects request info 805 and a dialog 830 appears. In another embodiment, the dialog 830 appears by default when the personal data sharing business interface opens. The dialog 830 allows the requestor to enter a cell phone number 835 and select a template 840 that determines what data the requestor is going to request.

If my history 810 is selected, the system will navigate to a history display, such as user interface 1000, as discussed below. If create template is selected, the system will navigate to a create template display, such as user interface 900, discussed below. If change password 820 is selected, the system will navigate to a change password display.

Figure 9:
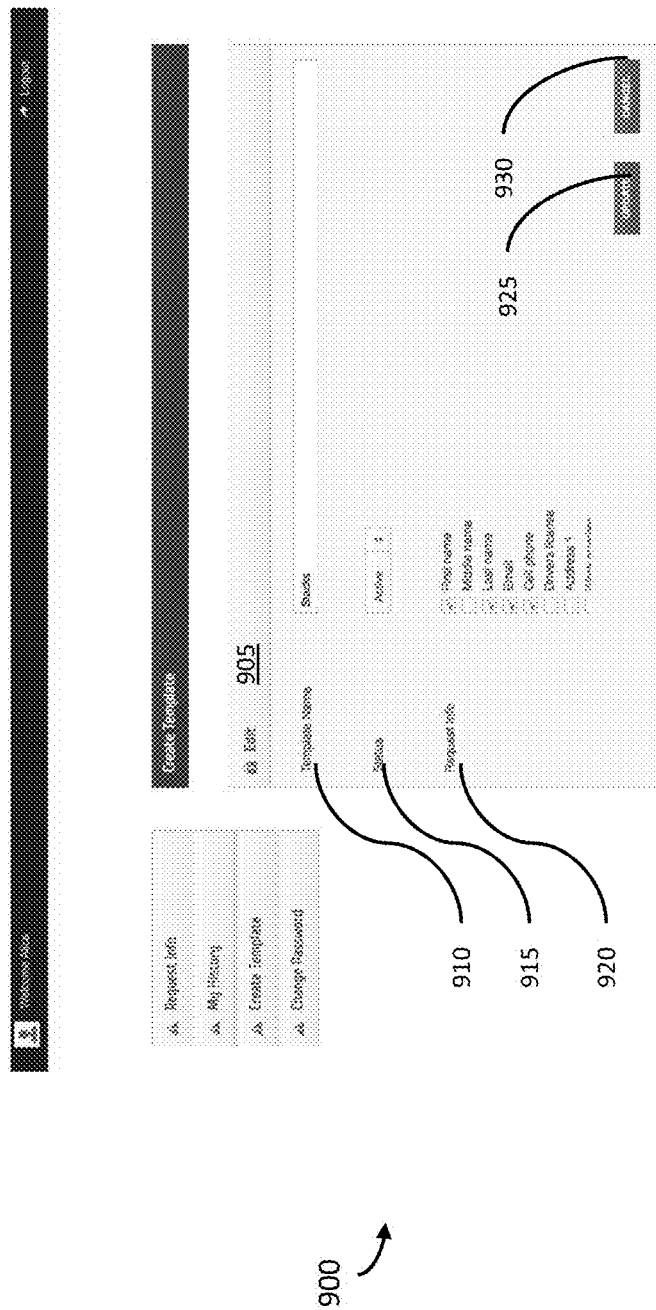
FIG. 9 is a figure representing a user interface illustrating a create template screen of a personal data sharing business interface that may be used in accordance with an illustrative embodiment.

FIG. 9 is a figure representing a user interface 900 illustrating a create template screen of a personal data sharing business interface that may be used in accordance with an illustrative embodiment. In alternative embodiments, fewer, additional, and/or different data and/or interactive elements may be included in the user interface. The user interface 900 includes a create template dialog 905. A template may be created here for information requests, which can be used as described here and throughout the present disclosure. The user can name the template at 910. The user can determine a status of the template at 915. For example, a status may be active or inactive. When a status is inactive, the template may not appear as an option in select template 840 in FIG. 8. The user can determine which data types will be requested at 920. The user can update 925 (or save) the template or cancel 930 the changes and return to a previous interface.

Figure 10:
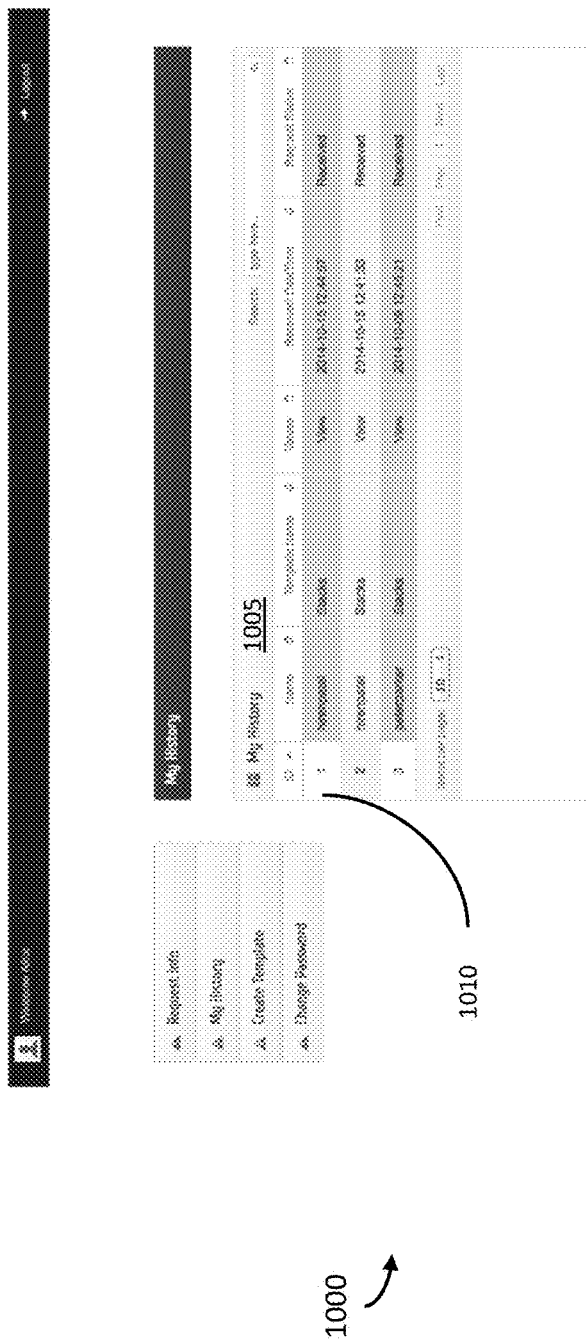
FIG. 10 is a figure representing a user interface illustrating a history screen of a personal data sharing business interface that may be used in accordance with an illustrative embodiment.

FIG. 10 is a figure representing a user interface 1000 illustrating a history screen of a personal data sharing business interface that may be used in accordance with an illustrative embodiment. In alternative embodiments, fewer, additional, and/or different data and/or interactive elements may be included in the user interface. The user interface 1000 includes a my history dialog 1005. It shows received granted requests for information. In the list 1010, it shows the name of the sender, what template they have released, what type of values are included in the released information, when the release was received, and a request status. Here all of the releases showing have been received. If a request has been made but not received, the request status may be "Pending." IF a request has been started but not sent, the request status may say "Not Sent."

Figure 11:
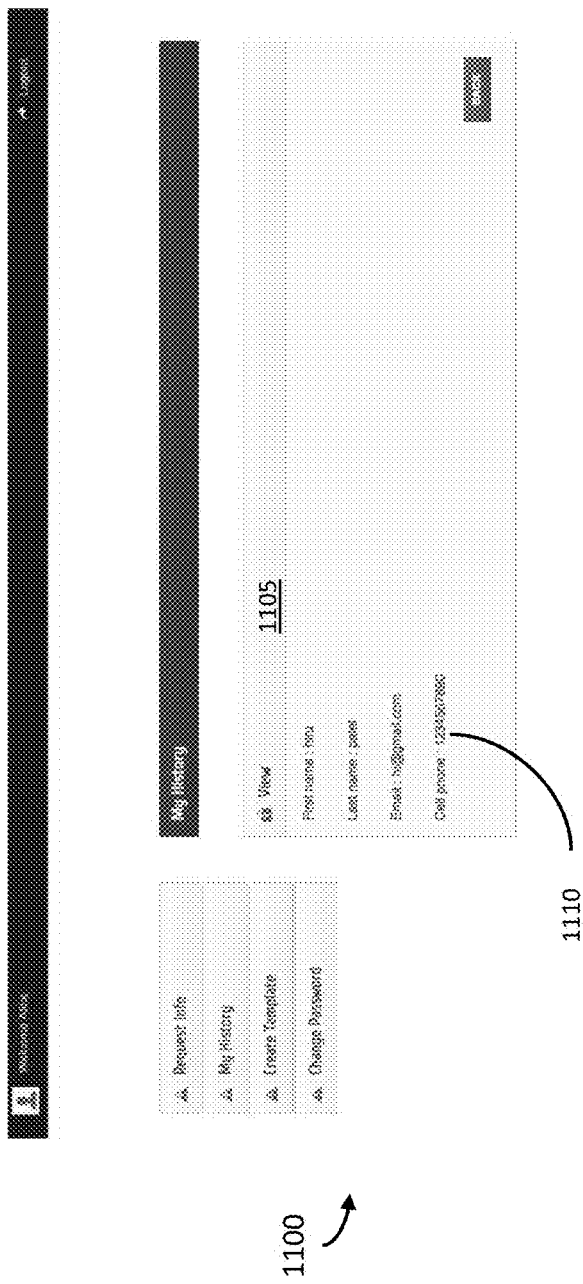
FIG. 11 is a figure representing a user interface illustrating a history detail screen of a personal data sharing business interface that may be used in accordance with an illustrative embodiment.

FIG. 11 is a figure representing a user interface 1100 illustrating a history detail screen of a personal data sharing business interface that may be used in accordance with an illustrative embodiment. In alternative embodiments, fewer, additional, and/or different data and/or interactive elements may be included in the user interface. The user interface 1100 includes a my history detail dialog 1105. If an entry from the list 1010 is selected, a history detail dialog 1105 of that entry is shown. The history detail dialog 1105 includes the information released in the request, which here is first name, last name, e-mail address, and cell phone number.

Figure 12:
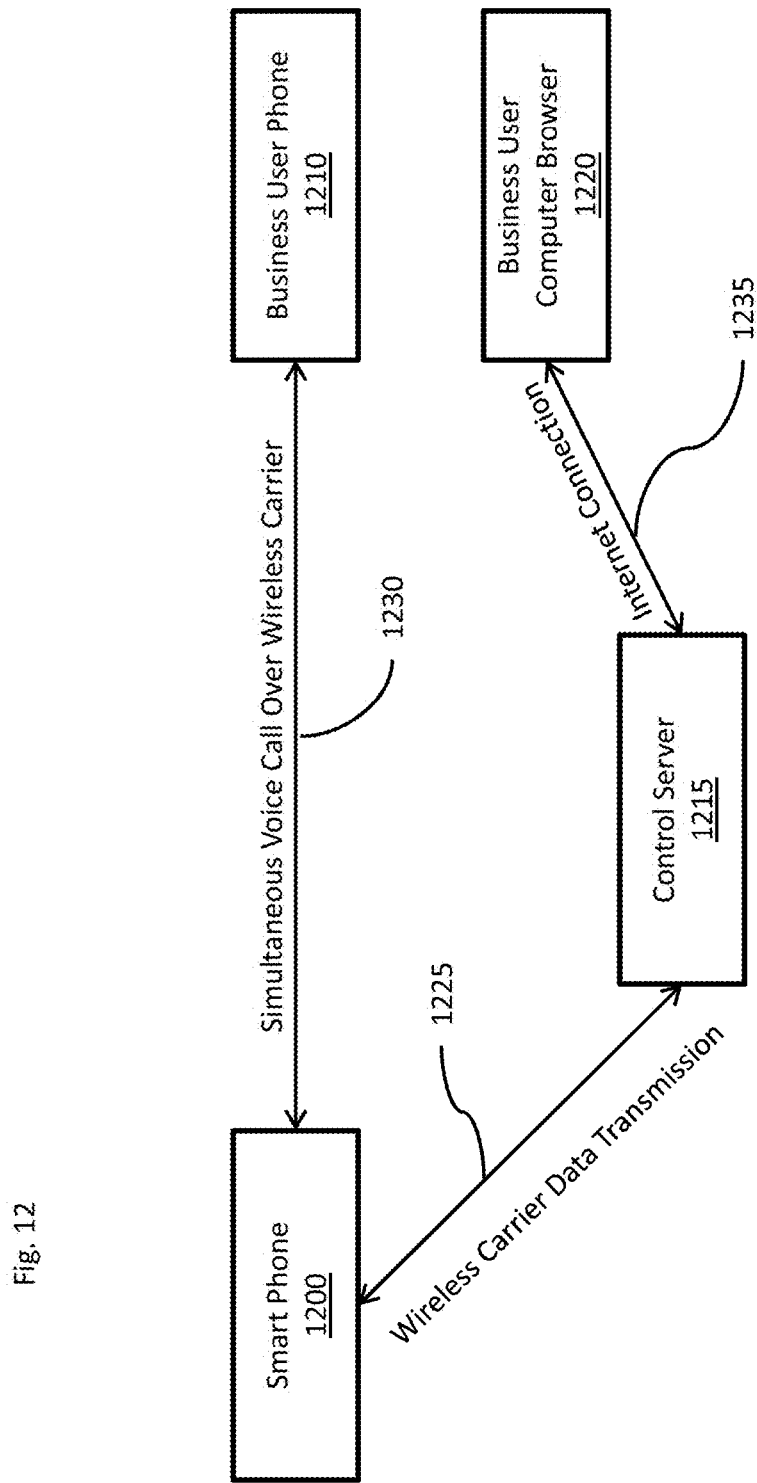
FIG. 12 is a block diagram illustrating a smart phone, control server, business user phone, and business user computer browser that may be used in accordance with an illustrative embodiment.

FIG. 12 is a block diagram illustrating a smart phone, control server, business user phone, and business user computer browser that may be used in accordance with an illustrative embodiment. In alternative embodiments, fewer, additional, and/or different components may be included in the system. FIG. 12 shows a possible embodiment for the systems and methods disclosed herein.

A smart phone 1200 is in communication with a control server 1215 over a wireless carrier data transmission 1225. The control server 1215 is also in communication with a business user computer browser 1220 over an internet connection 1235. The smart phone 1200 is also in communication with a business user phone 1210 over a simultaneous voice call over wireless carrier 1230. In this embodiment, while the business user phone 1210 is on a call with the smart phone 1200, information from the smart phone 1200 is sent to the business user computer browser 1220 in response to a request for information from the business user computer browser 1220.

Both the request for information and the granted request for information are routed through the control server 1215. The information passed to the business user computer browser 1220 can be stored on the business user's system. Additionally, the business user computer browser 1220 can provide a booking identifier to the smart phone 1200 through the control server 1215 after something has be purchased, reserved, etc. by the user of the smart phone 1200.

The smart phone 1200 may store personal data to share, control authentication of the release of that personal data, and store a history of requests. The control server 1215 can act as an administrator for the system. The control server may store company and business user authentications, a smart phone registry, different company and business rights and permissions, mediate communications between smart phones and business, and include information for field mapping and APIs as disclosed herein. The business user system (which may include the business user telephone and/or the business user computer browser 1220) stores different business rights and permissions (like their password(s)), a logo and possible messages for sending as identifiers of the company and as part of a request for information. The business user system can also select what information to request, make templates, initiate requests for information, make calls to the API, and store filled requests for information.

FIG. 13 is a block diagram illustrating a smart phone, control server, near field communication (NFC) device, and business user computer browser that may be used with an illustrative embodiment. In alternative embodiments, fewer, additional, and/or different components may be included in the system. FIG. 13 shows a possible embodiment for the systems and methods disclosed herein.

A smart phone 1300 with NFC capabilities is in communication with a control server 1215 over a wireless carrier data transmission 1225. The control server 1215 is also in communication with a business user computer browser 1310 over an internet connection 1235. The business user computer browser 1310 is capable of communicating with an NFC Device 1305 over a connection 1315. The smart phone 1320 can also communicate with the NFC Device 1305 over a connection 1320.

Here, the smart phone 1300 is at relatively the same location as the business user and the NFC Reader 1305. A business user computer browser 1310 can request information from the smart phone 1300 via an NFC Device 1305 (or in another embodiment an iBeacon™). The smart phone 1300 can receive the request, select fields to send back, and enter PIN as disclosed herein. The information is passed to the business user computer browser 1310 through either the NFC Device and connection 1320 or through the control server 1215 and the connections 1225 and 1235.

FIG. 14 is a flow diagram illustrating a method 1400 for using a personal data sharing app in accordance with an illustrative embodiment. In alternative embodiments, fewer, additional, and/or different operations may be performed. Also, the use of a flow diagram is not meant to be limiting with respect to the order of operations performed. In an operation 1405, a sender enters personal information into an app on the sender device.

In an operation 1410, the sender device and requestor engage in real time communication. In an operation 1415, the requestor device requests data from the sender device. In an operation 1420, the sender device receives the request for data from the requestor device. In an operation 1425, the app on the sender device displays the requestor identity and the requested types of data.

In an operation 1430, the app automatically populates the fields of the requested data types. In an operation 1435, the sender manually enters data that is not automatically populated. In an operation 1440, the sender can de-select data types that the sender would not like to sender to the requestor. In an operation 1445, the sender confirms sending selected data types to the requestor. In an operation 1450, the sender enters personal identification number (PIN).

In an operation 1455, the app verifies the sender's PIN against previously established PIN stored on the sender device. In an operation 1460, the sender device sends that granted request data to the requestor (including all of the data types that were allowed to be shared by the sender). In an operation 1465, the requestor receives the data shared by the sender device. In an operation 1470, the requestor device stores the data received from the sender device.

FIG. 15 is a flow diagram illustrating a method 1500 for using a personal data sharing app to receive a booking identifier in accordance with an illustrative embodiment. In alternative embodiments, fewer, additional, and/or different operations may be performed. Also, the use of a flow diagram is not meant to be limiting with respect to the order of operations performed. In an operation 1505, a requestor device transmits to a sender device a booking identifier during a real time communication.

In an operation 1510, the sender device app saves the booking identifier in the sender device memory. In an operation 1515, the sender and the requestor participate in a second real time communication. In an operation 1520, the requestor requests the booking identifier form the sender during the second real time communication. The sender can either send or decline to send the booking identifier to the requestor as disclosed herein.

FIG. 16 is a flow diagram illustrating a method 1600 for using a personal data sharing app with an NFC device in accordance with an illustrative embodiment. In alternative embodiments, fewer, additional, and/or different operations may be performed. Also, the use of a flow diagram is not meant to be limiting with respect to the order of operations performed. In an operation 1605, a sender device engages in communication with a near field communication (NFC) tag associated with a requestor device. The NFC tag may be directly connected to the requestor device such that the NFC tag can provide varying signals as determined by the requestor device. The NFC tag may also be connected wirelessly to the requestor device. In this embodiment, the requestor device can provide varying signals as determined by the requestor device. In these embodiments, the signals (which may be determined by the requestor device) may indicate to a sender device the data types that are requested, as well as an address of the requestor device or other instruction on where to route the requested data. In an alternative embodiment, the NFC tag may not be connected to the requestor device, but may nonetheless include the instructions to send requested data types to the requestor device or another device associated with the requestor device.

In an operation 1610, the sender device equipped with an NFC reader reads the NFC tag associated with the requestor device. In other words, the sender device can determine from the NFC tag what data to send to the requestor device and to where the data should be sent. In an operation 1615, the sender device associates the information from the NFC tag with a predefined data set of data types stored on the sender device. In other words, the signal from the NFC tag may indicate a predefined data set instead of individual data types. Upon reading the predefined data set, the sender device can determine which data types are a part of that predefined data set and can identify those data types for sending. For example, the NFC reader may read from the NFC tag an alphanumeric sequence that indicates that a credit card transaction data is needed. The sender device can then recognize that this credit card transaction data set requires the sender device to send, for example, the name on the credit card, the network or issuer of the credit card, the billing address of the credit card holder, the credit card number, the credit card expiration date, and the credit card security code. In another example, a different predefined data set may be information needed to sign up for an advertising newsletter, which may include information such as subscriber name, mailing address, e-mail address, and phone number. Using predefined data sets in this way may decrease the complexity of NFC tags and readers utilized. However, in an alternative embodiment, the NFC reader may read from the NFC tag alphanumeric sequences that indicate particular data types in addition to or in lieu of predefined data sets. In an operation 1620, the sender device, in response to the information acquired from the NFC tag, sends the requested data types to the requestor device through a server, wireless carrier data transmission, and/or the internet as in FIG. 13.

FIG. 17 is a flow diagram illustrating a method 1700 for using a personal data sharing app to share emulated card data in accordance with an illustrative embodiment. In an operation 1705, the sender device receives a request for emulated card data. As disclosed herein, this may be card data for a debit card, check card, credit card, pre-paid card, or any other type of card that may be used to transact currency. In this embodiment, the card is subject to per transaction and/or percentage of transaction fees paid to a card provider (e.g., Amex™, Master Card™ Visa™, etc.). Also in this embodiment, a transaction that is keyed in (or a similar transaction as discussed herein) is subject to relatively higher transaction fees than a transaction that utilizes emulated card information as disclosed herein.

In an operation 1710, the sender device responds to the request for the emulated card data and sends the emulated card data to the requestor. In an operation 1715, the requestor device receives the emulated card data. The requestor may then process a transaction that advantageously has a relatively lower transaction fee than a keyed in (or similar) transaction.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system that provides data sharing between a requestor device and a plurality of sender devices, the system comprising a first sender device of the plurality of sender devices configured to:
   receive a request for information from the requestor device during a real time communication between the first sender device and the requestor device, wherein the request for information comprises a request for a predefined set of data types and wherein the real time communication comprises a telephone call or voice over internet protocol (VoIP) call;
   determine, in response to the request for information, responsive data stored on the first sender device that is responsive to the predefined set of data types in the request for information;
   automatically populate, on a user interface of the sender device, the responsive data according to the predefined set of data types in the request for information;
   receive, through the user interface, a deselection of the at least one of the automatically populated data types, such that a deselected data type is not included in a granted request for information responsive to the request for information, and the granted request for information is only a subset of the predefined set of data types specified in the request for information; and
   send, to the requestor device during the real time communication, the granted request for information comprising any of the automatically populated responsive data other than the data related to the deselected data type.

2. The system of claim 1, wherein the requestor device is further configured to:
   determine a first identifier associated with the first sender device; and
   determine where to send the request for information based on the first identifier.

3. The system of claim 1, wherein the first sender device is further configured to receive a password or personal identification number (PIN) to authorize data sharing.

4. The system of claim 3, wherein the password or PIN is stored on the first sender device before receiving the password or PIN to authorize the data sharing.

5. The system of claim 4, wherein the sender device is further configured to determine that the password or PIN received to authorize the data sharing matches the password or PIN stored on the first sender device in order to authorize the data sharing.

6. The system of claim 4, wherein the password or PIN is not stored on or received by the requestor device.

7. The system of claim 1, wherein the granted request for information is received by the requestor device during the real time communication.

8. The system of claim 1, wherein the predefined set of data types comprises at least one of a person's name, address, a birthdate, rewards number, financial account information, driver's license number, phone number, booking identifier, and e-mail address.

9. The system of claim 1, wherein, prior to the granted request for information being sent to the requestor device, the responsive data is stored only on the first sender device.

10. The system of claim 1, wherein the first sender device is further configured to receive additional requests for information from a plurality of requestor devices, wherein the additional requests specify different predefined set of data types from the request for information, and wherein the additional requests for information have a similar format to the request for information.

11. A method according to a set of instructions stored on the memory of a computing device that provides data sharing between a requestor device and a plurality of sender devices, the method comprising:
receiving, by a processor of the computing device, a request for information from the requestor device during a real time communication between a first sender device of the plurality of sender devices and the requestor device, wherein the request for information comprises a request for a predefined set of data types and wherein the real time communication comprises a telephone call or voice over internet protocol (VoIP) call;
sending, by the processor, the request for information to the first sender device during the real time communication;
receiving, by the processor, in response to the request for information sent to the first sender device, a granted request for information comprising only an authorized subset of responsive data from the first sender device that is responsive to the request for information, wherein:
the authorized subset of the responsive data comprises only some of the predefined set of data types specified in the request for information,
an indication of which of the responsive data is authorized to include in the granted request for information is received through a user interface of the sender device, and
the indication comprises a deselection of at least one type of the predefined set of data types in the request for information, such that the authorized subset does not include a deselected data type in the responsive data; and
sending, by the processor during the real time communication, the responsive data to the requestor device comprising only the authorized subset of the predefined set of data types.

12. The method of claim 11, further comprising receiving a subscription request from the requestor device before the request for information is received.

13. The method of claim 11, further comprising receiving a registration request from the first sender device before the request for information is received, wherein the registration request comprises and identifier associated with the first sender device, and further wherein the registration request does not include any of the responsive data.

14. The method of claim 13, wherein the identifier is used to determine where to send the request for information.

15. The method of claim 11, wherein the real time communication comprises a real time audio communication.

16. An apparatus comprising a server that provides data sharing between a requestor device and a plurality of sender devices comprising:
a memory;
a processor operatively coupled to the memory; and
a first set of instructions stored on the memory and configured to be executed by the processor, wherein the processor is configured to:
receive a request for information from the requestor device during a real time communication between a first sender device and the requestor device, wherein the request for information comprises a request for a predefined set of data types and wherein the real time communication comprises a telephone call or voice over internet protocol (VoIP) call;
send the request for information to the first sender device during the real time communication;
receive, in response to the request for information sent to the first sender device, a granted request for information comprising only an authorized subset of responsive data from the first sender device that is responsive to the request for information, wherein:
the authorized subset of the responsive data comprises only some of the predefined set of data types specified in the request for information,
an indication of which of the responsive data is authorized to include in the granted request for information is received through a user interface of the sender device, and
the indication comprises a deselection of at least one type of the predefined set of data types in the request for information, such that the authorized subset does not include a deselected data type in the responsive data; and
send, during the real time communication, the responsive data to the requestor device comprising only the authorized subset of the predefined set of data types.

17. The apparatus of claim 16, wherein the real time communication comprises a real time voice and text communication.

18. An apparatus that provides data sharing between a requestor device and a plurality of sender devices, the apparatus comprising:
a memory;
a processor operatively coupled to the memory; and
a first set of instructions stored on the memory and configured to be executed by the processor, wherein the processor is configured to:
determine a first identifier associated with a sender device;
determine whether the first identifier is on a list of registered sender devices;
send a request for information to the sender device during a real time communication between the sender device and the requestor device, wherein the request for information comprises a request for a predefined set of data types and wherein the real time communication comprises a telephone call or voice over internet protocol (VoIP) call;
receive from the sender device, a granted request for information comprising only an authorized subset of data requested in the request for information, wherein:
the granted request for information is received during the real time communication,
the authorized subset of the responsive data comprises only some of the predefined set of data types specified in the request for information,
an indication of which of the responsive data is authorized to include in the granted request for information is received through a user interface of the sender device, and the indication comprises a deselection of at least one type of the predefined set of data types in the request for information, such that the authorized subset does not include a deselected data type in the responsive data.

* * * * *